US010642360B2

(12) United States Patent
Mangharam et al.

(10) Patent No.: US 10,642,360 B2
(45) Date of Patent: May 5, 2020

(54) METHODS, SYSTEMS, AND COMPUTER READABLE MEDIA INVOLVING A CONTENT COUPLED PHYSICAL ACTIVITY SURFACE

(71) Applicant: The Trustees of the University of Pennsylvania, Philadelphia, PA (US)

(72) Inventors: Rahul Mangharam, Philadelphia, PA (US); Orkan Telhan, Philadelphia, PA (US); Kuk Jin Jang, Philadelphia, PA (US); Matthew Edward O'Kelly, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/389,085

(22) Filed: Dec. 22, 2016

(65) Prior Publication Data
US 2017/0177084 A1 Jun. 22, 2017

Related U.S. Application Data

(60) Provisional application No. 62/271,112, filed on Dec. 22, 2015.

(51) Int. Cl.
*G06F 3/01* (2006.01)
(52) U.S. Cl.
CPC .............. *G06F 3/016* (2013.01); *G06F 3/011* (2013.01)
(58) Field of Classification Search
CPC .................................. G06F 3/016; G06F 3/011
(Continued)

(56) References Cited

U.S. PATENT DOCUMENTS

2001/0003712 A1* 6/2001 Roelofs .................. G06F 3/011
463/37
2012/0053015 A1* 3/2012 Esaki ..................... A63B 69/00
482/8
(Continued)

OTHER PUBLICATIONS

Jang et al., "CloudMat:Context-aware Personalization of Fitness Content," University of Pennsylvania Scholarly Commons, Real-Time and Embedded Systems Lab, 2015 IEEE International Conference on Services Computing, pp. 301-308 (Jun. 27, 2015).
(Continued)

*Primary Examiner* — Stephen G Sherman
(74) *Attorney, Agent, or Firm* — Jenkins, Wilson, Taylor & Hunt, P.A.

(57) ABSTRACT

Methods, systems, and computer readable media involving a content coupled physical activity surface are disclosed. One system includes a processor and a memory. The system is configured to receive information about a physical action performed by a user based on feedback from a physical activity surface including at least one sensor for detecting physical activity of the user, to determine, based on the feedback, configuration information, and metadata associated with a content coupled experience involving a physical action sequence, a second physical action to perform, information for prompting the user to perform the second physical action, and information for detecting the second physical action via the physical activity surface, and to provide, to the physical activity surface, the information for prompting the user to perform the second physical action and for detecting the second physical action via the physical activity surface.

23 Claims, 10 Drawing Sheets

(58) Field of Classification Search
USPC .......................................................... 345/156
See application file for complete search history.

(56) References Cited

U.S. PATENT DOCUMENTS

| | | | | |
|---|---|---|---|---|
| 2012/0058861 | A1* | 3/2012 | Satut ........................ | A63B 6/00 |
| | | | | 482/8 |
| 2014/0035735 | A1* | 2/2014 | Zellers ..................... | G08B 6/00 |
| | | | | 340/407.2 |
| 2015/0364059 | A1* | 12/2015 | Marks ................ | G09B 19/0038 |
| | | | | 482/9 |
| 2016/0026263 | A1* | 1/2016 | Pesonen .................. | G06F 3/016 |
| | | | | 345/156 |

OTHER PUBLICATIONS

Vaidyanthan, "Yoga Mat Project UPenn," Youtube Video and transcription of video, https://www.youtube.com/watch?v=CjGKmutJSf8, pp. 1-228 (Apr. 30, 2014).

* cited by examiner

METHODS, SYSTEMS, AND COMPUTER READABLE MEDIA INVOLVING A CONTENT COUPLED PHYSICAL ACTIVITY SURFACE

PRIORITY CLAIM

The present application claims the benefit of U.S. Patent Application Ser. No. 62/271,112, filed Dec. 22, 2015, the disclosure of which is incorporated herein by reference in its entirety.

TECHNICAL FIELD

The subject matter described herein relates to immersive technology. More particularly, the subject matter described herein relates to methods, systems, and computer readable media involving a content coupled physical activity surface.

BACKGROUND

Immersive and/or interactive technologies, such as virtual reality (VR) headsets, allow users to interact with a virtual environment. While such technologies attract considerable consumer interest, user experience and/or usability among other issues hinder greater adoption of these technologies. In particular, restrictive user input devices and/or limited immersive or interactive content can detract from a user's overall experience using currently available immersive and/or interactive technologies.

Accordingly, there exists a need for improved methods, systems, and computer readable media involving a content coupled physical activity surface.

SUMMARY

Methods, systems, and computer readable media involving a content coupled physical activity surface are disclosed. One system includes a processor and a memory. The system is configured to receive information about a physical action performed by a user based on feedback from a physical activity surface including at least one sensor for detecting physical activity of the user, to determine, based on the feedback, configuration information, and metadata associated with a content coupled experience involving a physical action sequence, a second physical action to perform, information for prompting the user to perform the second physical action, and information for detecting the second physical action via the physical activity surface, and to provide, to the physical activity surface, the information for prompting the user to perform the second physical action and for detecting the second physical action via the physical activity surface.

The subject matter described herein may be implemented in hardware, software, firmware, or any combination thereof. As such, the terms "function" or "node" as used herein refer to hardware, which may also include software and/or firmware components, for implementing the feature (s) being described. In some example implementations, the subject matter described herein may be implemented using at least one computer readable medium having stored thereon computer executable instructions that when executed by at least one processor of at least one computer control the at least one computer to perform steps. Example computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to a physical activity surface and includes methods, techniques, and mechanisms for configuring, interacting with, and/or using a physical activity surface. In accordance with some aspects of the subject matter described herein, various In accordance with some aspects of the subject matter described herein, methods, techniques, systems, and/or mechanisms may be used for content coupled experiences that involve closed loop feedback between user state in the physical world and user state in a virtual world. For example, user state may be captured in part by a physical activity surface (e.g., a sensor and haptic feedback enabled activity "mat") and may be relayed to a content system. In this example, the content system may use the user state to enhance a content coupled experience (e.g., by interacting with the user via haptic feedback elements at the physical activity surface and/or by modifying the experience in response to detected physical activities performed by the user).

In accordance with some aspects of the subject matter described herein, methods, techniques, systems, and/or mechanisms may be used for facilitating bidirectional communications between a content system and a user via a physical activity surface. For example, a content system may provide a content coupled experience via seamless delivery of content (e.g., a video) and instructions for haptic feedback (e.g., light effects, vibrations, sound effects, etc.) via a physical activity surface and/or other experience related devices. In another example, a content system may facilitate social interactions between multiple users or a community via multiple network connected physical activity surfaces.

In accordance with some aspects of the subject matter described herein, methods, techniques, systems, and/or mechanisms may be used for personalizing a content coupled experience associated with a physical activity surface. For example, a user may personalize content delivery in response to physical activity detected via a physical activity surface and/or user related context information. In another example, personalization may involve activity-based personalization, spatial personalization, temporal personalization, content personalization, and/or modes of interaction.

Figure 1:
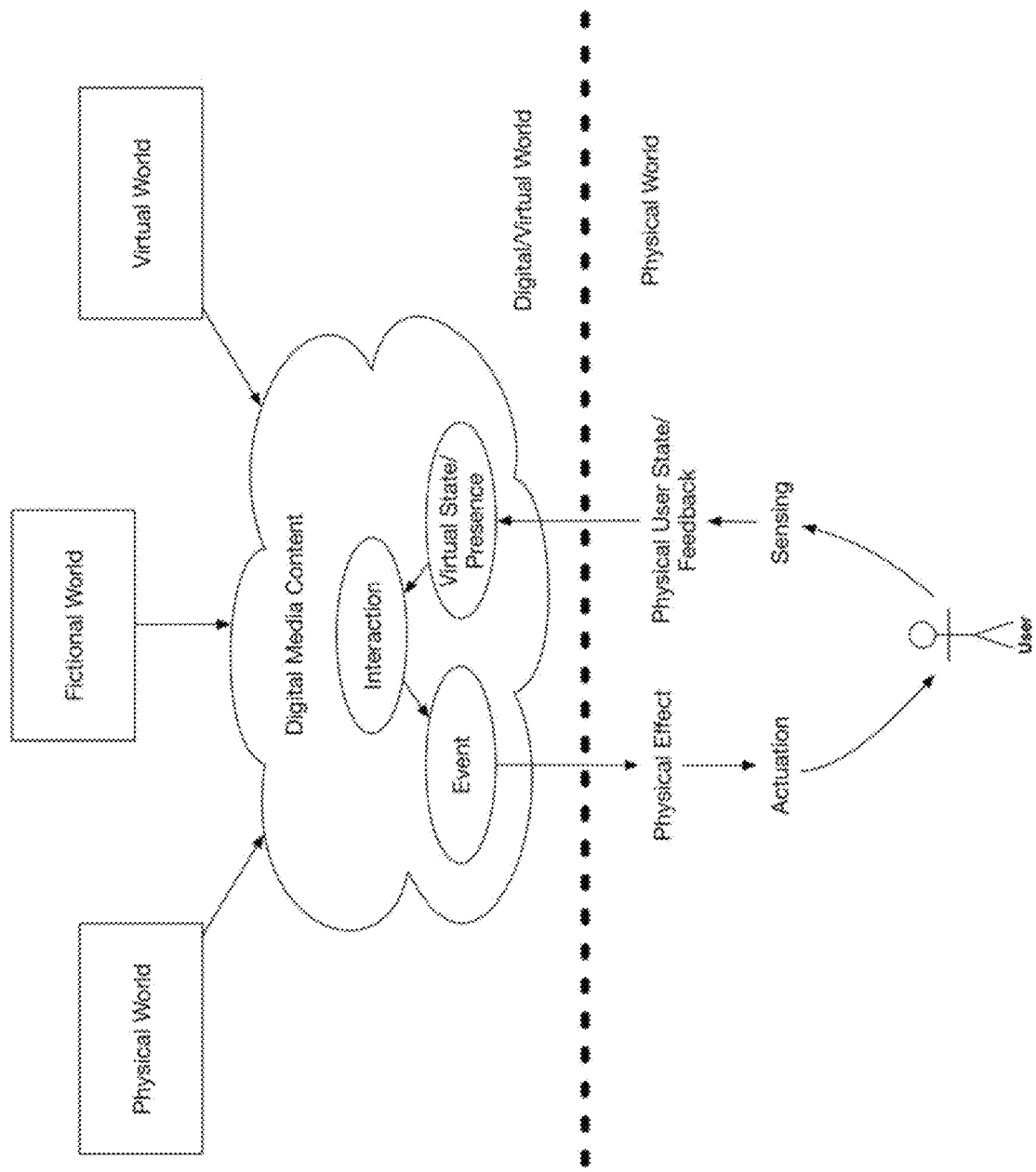
FIG. 1 is a diagram illustrating a content coupled experience according to an embodiment of the subject matter described herein.

FIG. 1 is a diagram illustrating a content coupled experience according to an embodiment of the subject matter described herein. A content coupled experience may involve an experience enhanced by closed loop feedback between user state in the physical world and context of content (e.g., a video) being displayed concurrently. For example, user state and/or user feedback may be captured, in part, by a physical activity surface (PAS) and relayed to a content system. In this example, the content system may enhance an overall experience based on the user feedback by modifying, adjusting, or generating content being concurrently displayed to the user. In some embodiments, a content coupled experience may be an immersive (e.g., interactive) experience that includes haptic feedback (e.g., sound effects, vibrations, lighting, etc.) for one or more interfaces, such as a PAS, other than video and sound displayed through a screen.

Referring to FIG. 1, a user may interact with a virtual world via a PAS in the physical world. A PAS may represent any device for detecting physical activity and for providing physical effects and/or haptic feedback to the user. In some embodiments, a PAS may include one or more sensors for detecting physical user state and/or feedback. For example, a PAS may include a sensor array for detecting pressure, contact, and/or heat associated with a user's body or body parts. In some embodiments, a PAS may include one or more components or actuators, such as programmable lighting elements, speakers, or one or more display screens, for performing a physical effect (e.g., blinking lights indicating a user to stand in a certain stance) and/or prompting a user to perform a physical activity. For example, a PAS may include actuators for generating vibrations, speakers for outputting sounds, and/or thermochromic ink for displaying visual effects.

A digital and/or virtual world may represent an environment for creating, modifying, and/or storing digital content. For example, digital media content may be stored in a content system (e.g., a content delivery system or related service). In this example, the media content may be based on a virtual world (e.g., a massively multiplayer online role-playing game), a fictional world (e.g., a science fiction movie or book), or a physical world (e.g., an exercise or instructional video).

In some embodiments, a content system may use feedback (e.g., detected physical activity) received from a PAS to modify, enhance, and/or personalize digital content or related interactions with the user, e.g., via the PAS and/or actuators or haptic feedback elements therein. In some embodiments, a virtual state and/or presence of a user may be maintained by a content system providing content coupled experiences involving a PAS. For example, a content system may maintain information about a virtual avatar's location in a virtual world based on physical activity (e.g., walking in a particular direction) detected by a PAS.

In some embodiments, a content system may use virtual state information for modifying and/or affecting digital content. For example, assuming a user is interacting with a PAS to represent an avatar traveling in a virtual world, a content system may identify terrain in the virtual world that an avatar is to encountered based on an avatar's current location and the current direction the user is walking on the PAS. In this example, the identified terrain may be represented as an event sent to the user, where the event may include physical effects (e.g., vibrations) implemented by the PAS along with images of the terrain and/or associated landmarks at the PAS or a related display.

In some embodiments, content in a content coupled experience may augment conventional digital media (e.g., video and audio) with metadata or additional content. Examples of metadata or additional content may include contextual information (e.g., regarding conventional digital media and/or user input) as well as events (e.g., haptic feedback events performed by a PAS for prompting or inducing a user to perform a physical activity) that occur in association with the content. For example, context may be object related, actor related, agent related, scene related, and/or theme related. In this example, a content coupled experience may involve a video with multiple actors, where one actor is selected by the user to mimic via the PAS. Continuing with this example, during video playback, actions performed by the actor may be diagramed or otherwise indicated using the PAS via events (e.g., events that instruct programmable lights embedded in the PAS to flash in various areas for indicating feet and/or hand placement for mimicking the actor). In some embodiments, context and events within the content may be encoded as metadata (e.g., data indicating what is happening in a video and/or by whom). In some embodiments, some metadata (e.g., event logs and context tags) may be delivered synchronously or asynchronously with legacy or conventional media content.

Figure 2:
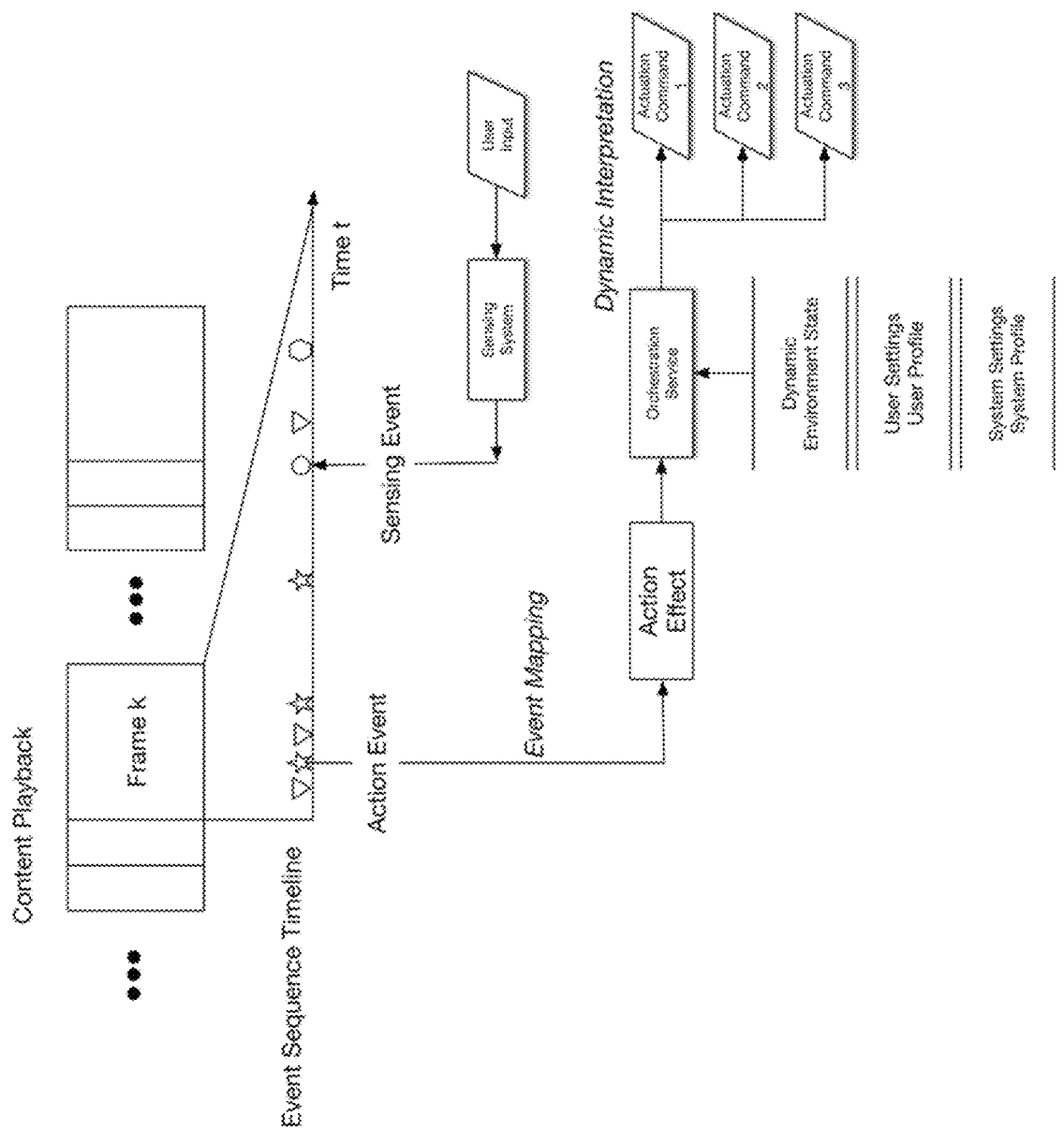
FIG. 2 is a diagram illustrating metadata stream generation and management according to an embodiment of the subject matter described herein.

FIG. 2 is a diagram illustrating metadata stream generation and management according to an embodiment of the subject matter described herein. In some embodiments, content context or related data may be encoded as metadata and may be mapped according to an event sequence timeline. For example, an event sequence timeline may represent one or more events, such as an action event, sensing event, or a combination of both, that should occur in relation to content playback. During content playback, these events may be delivered, initiated, and/or implemented synchronously or asynchronously with the content.

In some embodiments, as an event is delivered to a user or a related PAS, a real-time event mapping and interpretation of the event may occur according to environment state information, user profiles, and/or a system or experience configuration. For example, an action event may be mapped to action effect, such as a haptic feedback event, for prompting a user, via one or more haptic feedback elements, to perform an action. In this example, the action event may be interpreted by an orchestration service into an actuation command. In this example, an orchestration event may use various factors, such as user preferences, historical information, user's skill level, and/or other information, when determining an actuation command for the action event. In another example, a sensing event may represent an event for detecting user input (e.g., a physical activity or action performed by a user) via a sensing system (e.g., a sensor array in a PAS). In this example, the sensor event may detect user input synchronously (e.g., according to the timeline) or asynchronously (e.g., different from the timeline or concurrently with an action event).

In some embodiments, an event may involve or include one or more action primitives. An action primitive may represent various attributes associated with facilitating, detecting, and/or interpreting physical activity, e.g., at or via a PAS. For example, an action primitive may indicate an actuation, a type of input, a method of detection, and an interpretation of the input for a particular action. Action primitives may be relative and may have different attributes and/or meaning based on user perspective and/or machine perspective (e.g., a PAS perspective or a content system perspective).

In some embodiments, user related action primitives may include or indicate spatial information and/or temporal information. For example, spatial information regarding user input may represent or indicate where, on the surface of a PAS, to perform an action or portions thereof. In this example, spatial information may indicate hand and/or feet position(s) on a PAS for one or more physical activities, such as a yoga pose, an exercise routine, a fighting stance, or a virtual reality game maneuver. In another example, temporal information regarding user input may represent or indicate when to perform an action or portions thereof. In this example, temporal information may indicate absolute or relative time(s) for performing an action, portions thereof, or a sequence of actions.

In some embodiments, machine related action primitives may include or indicate action actuation information, action detection information, and/or action interpretation information. For example, action actuation information may represent or indicate where to detect, give, or send user input (e.g., to a content system. In this example, action actuation information may indicate a particular content system or microservice that is to receive user input for processing. In another example, action detection information may indicate a subset of sensors in a PAS that is to detect user input for a given action. In another example, action interpretation information may represent or indicate how to detect or sense physical activity from the user, e.g., certain changes in pressures on a PAS may indicate a user running in one content coupled experience and the same changes in pressures on the PAS may indicate a user swimming or boxing in another content coupled experience.

In some embodiments, action primitives may be building blocks for logical action groupings. For example, a pose may represent a group of action primitives, a sequence of poses may represent multiple poses, a task may represent related poses, and a routine may represent multiple tasks related to a same or similar objective. In this example, an objective may represent a goal related to physical activity routine and may be used as a basis of user evaluation. Some examples of objectives may include an exercise related objective (e.g., a cardiovascular workout, a yoga workout, a weight loss program, etc.), an entertainment related objective (e.g., a video game, a role playing game, a virtual reality simulation, etc.), an education related objective (e.g., a gym class assignment, a study reward/punishment exercise, etc.), a group related interaction objective (e.g., a multiple player game, a sports competition, etc.), or other objectives.

Figure 3:
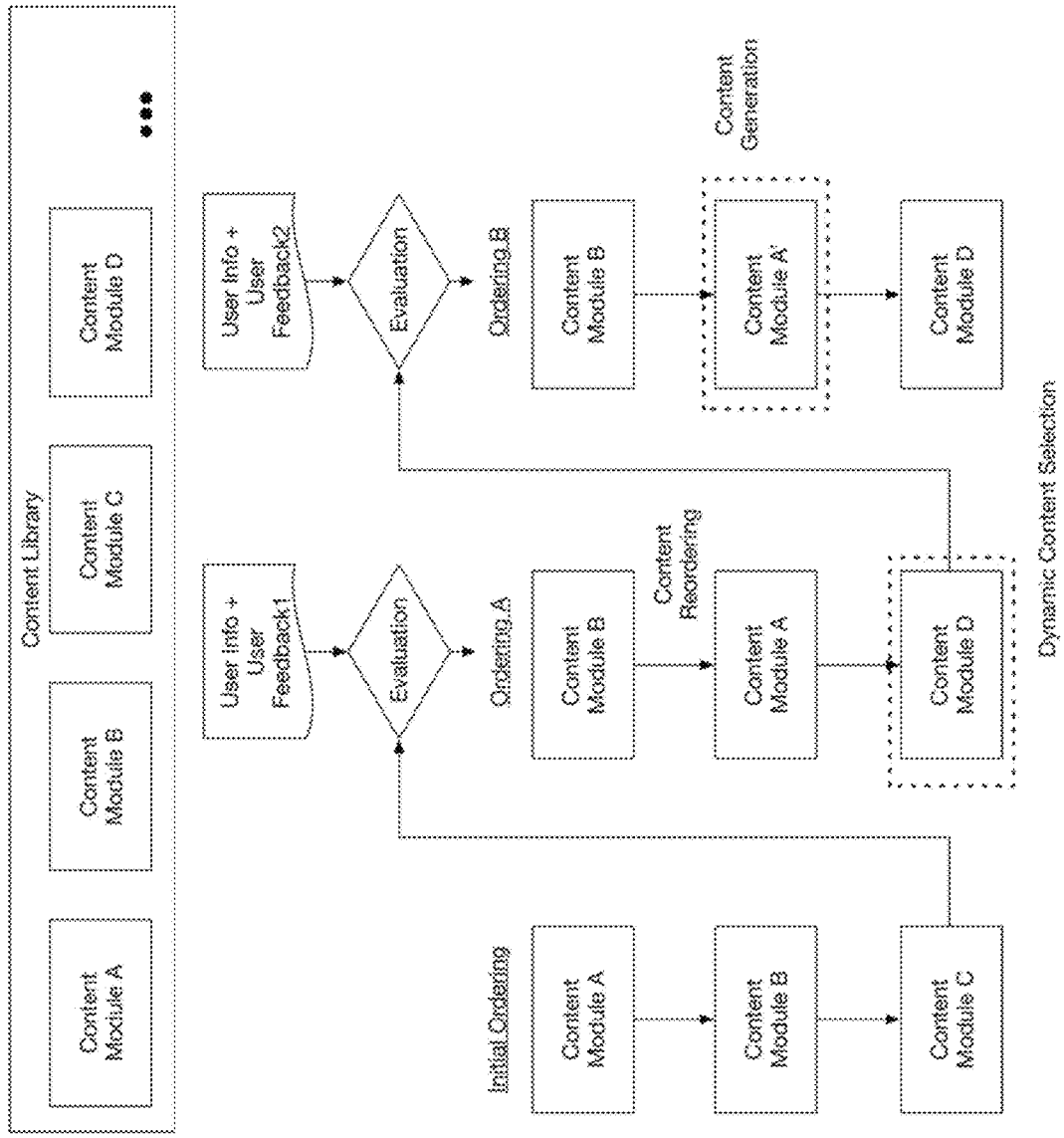
FIG. 3 is a diagram illustrating dynamic content selection according to an embodiment of the subject matter described herein.

FIG. 3 is a diagram illustrating dynamic content selection according to an embodiment of the subject matter described herein. In some embodiments, a content system (e.g., a content service) implemented using one or more computing platforms (e.g., servers, routers, and/or storage devices) may deliver content to a PAS and/or related devices (e.g., display screens, televisions, auxiliary computers, room lighting, tactile devices, or gaming systems) via one or more data packets or data streams.

In some embodiments, content associated with a PAS may comprise multiple content blocks or content modules that can be dynamically generated, adjusted, and/or reordered. For example, assuming content includes an exercise routine, each content module may represent an individual exercise or a related group of exercises in the routine. In this example, a content service may be configured to use maintained user state and preferences when determining the order of the content modules to be provided. In some embodiments, a dynamic response associated with content modules may be real-time or asynchronous.

In some embodiments, content or content modules may be generated based on user feedback and/or user preferences. For example, content may be generated and/or packaged based on a user's detected performance or a related skill level. In this example, a content system may generate one or more yoga poses on-the-fly for a user based on a user's previous exercise routines or lack thereof.

In some embodiments, content modules may be stored in a content library (e.g., a data structure or related storage device). In such embodiments, the content system may select content modules based on various factors, such as a default or initial ordering of content modules based on a content coupled experience selected by a user.

In some embodiments, the content system or a related device may adjust, reselect, generate, and/or reorder content modules based on various factors, e.g., user state information (e.g., user input), user preferences, and/or historical information. In such embodiments, a user evaluation module or another entity may determine whether content modules should be reordered. For example, a content system may determine, based at least in part on a user evaluation, to change an order of content modules from A→B→C (Initial Ordering) to B→A→D (Ordering A). In this example, the content system may determine, based on a user's skill level, preferences, or previous user feedback, that content module 'C' should be replaced with content module 'D'. In another, a content system may determine, based at least in part on a user evaluation, to change an order of content modules from B→A→D (Ordering A) to B→A"→D (Ordering B). In this example, the content system may determine, based on a user's skill level, preferences, or previous user feedback, that content module 'A' should be replaced with or adjusted to content module 'A''', where content module 'A''' is a more difficult variation of a same exercise indicated by content module 'A'.

Figure 4:
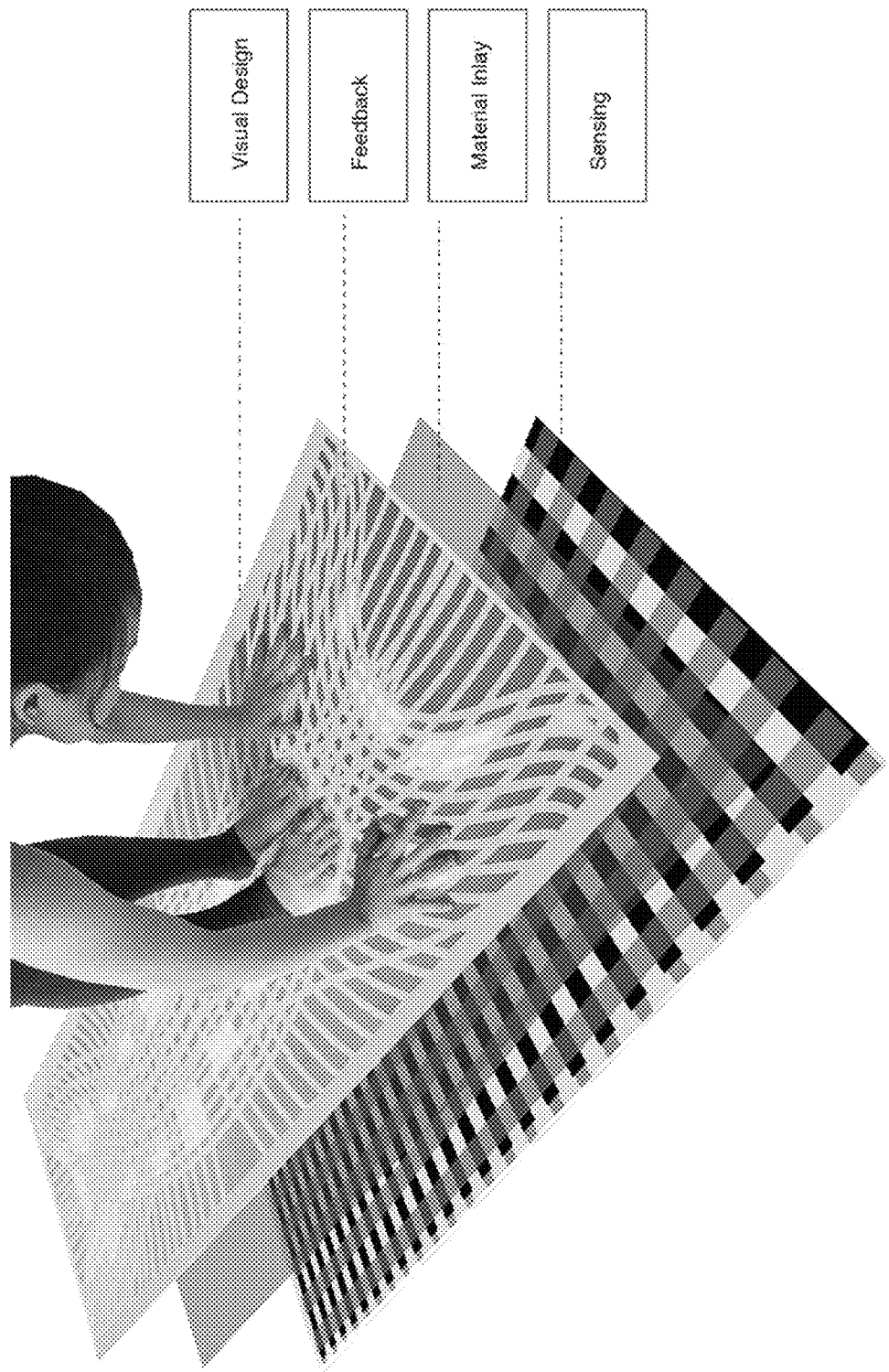
FIG. 4 is a diagram illustrating a physical activity surface according to an embodiment of the subject matter described herein.

FIG. 4 is a diagram illustrating a PAS according to an embodiment of the subject matter described herein. In some embodiments, a PAS may be designed for variable form factors (e.g., circular, horizontal, or square) suitable for different physical activities. For example, a PAS may be designed for individual users but can be connected to allow for collective or community based interaction. In some embodiments, each of a group of PASs may be connected to the Internet or a data network via wired and/or wireless networking technology, e.g., Ethernet, Wi-Fi, cellular technology, etc. In such embodiments, the PASs may connect and communicate via a content system or related service for interactive group sessions.

In some embodiments, the PAS may be composed of several layers which are modular in design and may be integrated into a single layer through printed electronics techniques. For example, a PAS may be designed with four main layers: a visual design layer, a sensing layer, a feedback layer, and a material inlay layer.

In some embodiments, a visual design layer may include instructions, aesthetic and informative visual design elements that are specific to the activity type, e.g., cross training, gaming, tennis, running, yoga, rowing, etc. For example, a topmost layer of a PAS may include instructions for using the PAS and/or patterns that are useful for various physical activities. In some embodiments, the visual design layer may be reconfigurable and interchangeable. For example, designs may be printed with graphic elements that can be shared by multiple activities, repurposed, and/or reprogrammed (e.g., via electrochromic inks) according to a current content coupled experience or physical activity.

In some embodiments, a sensing layer may include a sensor array, circuitry, and/or passive sensing elements (e.g., pressure sensitive foam) to detect user activity. For example, a sensing layer may include a novel sensor array which detects activity and/or pressure across the mat. In this example, the resolution of the sensor array may vary depending on the specific implementation such that specific parts of the mat can be used for finer or coarser types of sensing based on the content coupled experience or physical activity. In some embodiments, the sensing layer may include printed electronics elements, such as printed resistors and conductive traces, which can eliminate or reduce some complex and costly assembly procedures.

In some embodiments, a feedback layer (e.g., an actuation layer) may include haptic feedback elements, such as programmable lighting elements, that may prompt a user to perform a physical activity, e.g., by delivering instructions and content to the user. For example, programmable lighting elements may be implemented with light emitting diodes (LEDs) or printed directly onto a PAS using electrochromic inks, thermochromic inks, or magnetic particles which can be activated to display different shapes or forms. In some embodiments, the feedback layer may also include printed speakers that can be utilized for delivering sound and audio based instructions.

In some embodiments, a material inlay layer may define or determine the physical properties and the ergonomics of the surface (e.g., thickness, padding, softness, etc.) and may include one or more inlay materials, such as foam, silicone or polyvinyl chloride (PVC).

In some embodiments, the PAS may include or be communicatively coupled to an experience button and/or a user interface. For example, a PAS related user interface may be usable for personalizing and configuring content coupled experiences and/or the PAS itself. In this example, the PAS related user interface may be accessible via an experience button located on the top edge of the PAS or on a display screen associated with the PAS. In this example, by clicking the experience button, a user may access a selectable menu for configuring sensing, actuation, and/or encoding options for an enhanced user experience.

In some embodiments, a PAS related user interface may allow configuring a level of sensing, actuation, and interactivity with a content system or related service, selecting sensors and actuators that are active or utilized, various activity specific preferences (e.g., selecting a specific actor or object in a movie to mimic in a content coupled experience), starting a calibration procedure (e.g., a calibration procedure for a sensor array or programmable lighting elements), selecting what information may be exchanged with the content system, adding or removing content services, devices, and networks associated with a PAS. Additional details regarding an experience button and personalization and/or configuration options are discussed below in relation to FIG. 7.

Figure 5:
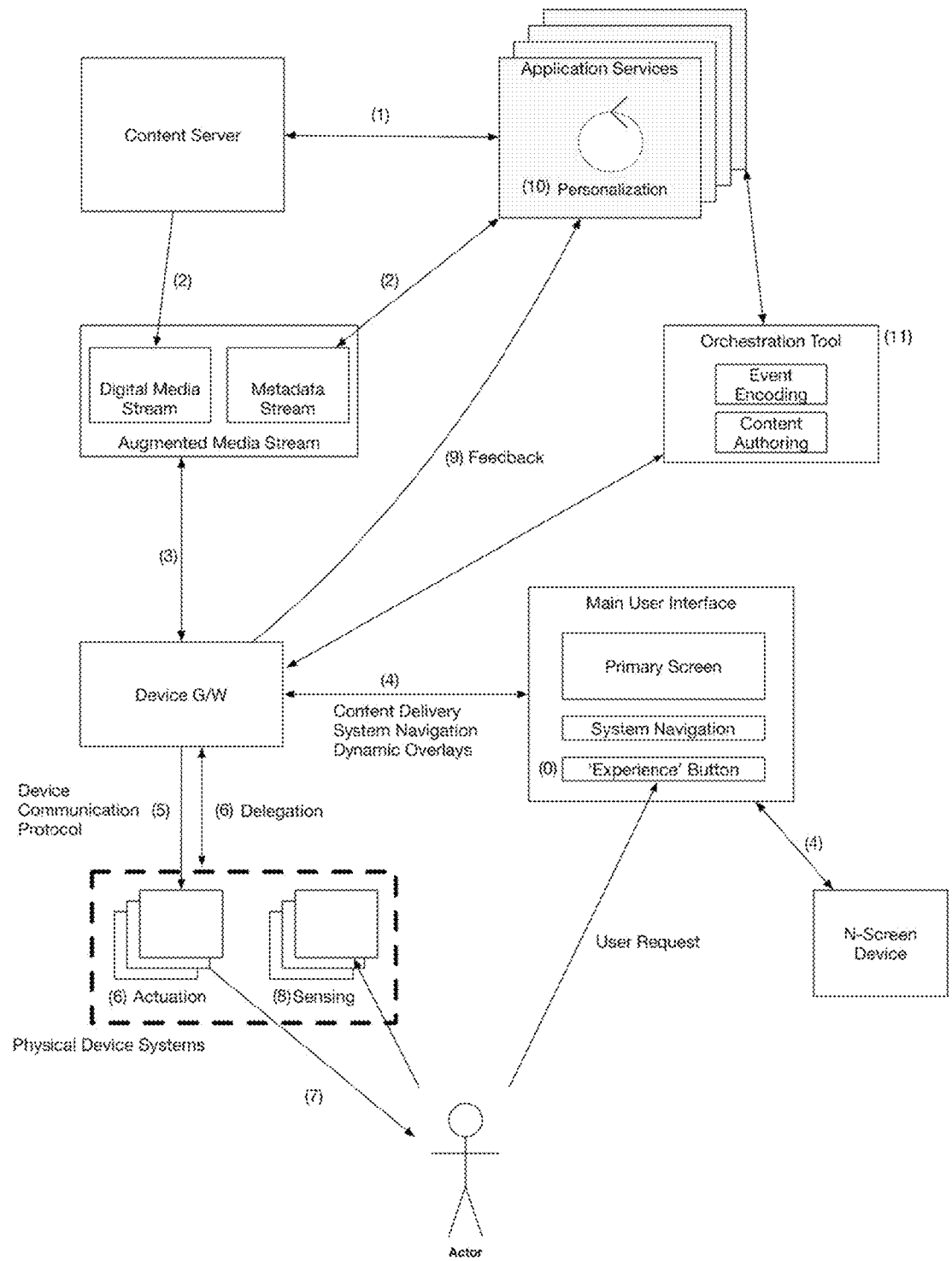
FIG. 5 is a diagram illustrating a content system according to an embodiment of the subject matter described herein.

FIG. 5 is a diagram illustrating a content system according to an embodiment of the subject matter described herein. In some embodiments, a content system may include multiple computing platforms and/or devices and may use cloud computing technology and/or related services. For example, a content system may include servers or other components that act as a processing backend for providing content coupled experiences and/or related content. In this example, the content system may include content delivery servers, application servers implementing using one or more application services, a device gateway and/or middleware, and protocols and data structures which allow for content coupled experiences. In some embodiments, the content system may include, incorporate, or involve one or more cloud services and/or content services for providing various content and/or experiences to users and PASs.

In some embodiments, the content system and/or a related content service may be utilized when a user requests content via a user interface associated with a PAS. For example, a user can access a main user interface associated with a display screen communicatively coupled to a PAS and may use system navigation to input preferences and control an overall experience of a content coupled experience via an "experience button" (0). A content request may be handled by content delivery servers and application servers (1). These servers may work in conjunction to provide an augmented media stream (3) consisting of a digital media stream and a metadata stream provided by one or more application services. Content delivery may include delivery of the content itself as well as communication between a device gateway and a user as well as to secondary display devices (4). The device gateway may communicate with physical device systems (e.g., a PAS and/or related display devices) via various device communication protocols (5) and may delegate (6) the content or related metadata to the physical device systems (7). Sensing elements (8) associated with a PAS may detect or capture user state information (e.g., feedback from the user) and may deliver the user state information to the app servers (9). Based off the feedback, personalization of the experience (10) may be implemented or controlled. For authoring or modifying content or related metadata, the content system may utilize an orchestration tool or service (11) for content authoring, event (e.g., metadata) encoding, and/or experience orchestration.

In some embodiments, the content system may utilize multiple application programming interfaces (APIs) to various services and/or components for allowing third party integration and technology agnostic development. In some embodiments, the content system may include an orchestration tool or other tools that utilize one or more APIs for content authoring, event encoding, and/or experience orchestration.

In some embodiments, the content system may include one or more content servers. A content server may store and deliver content modules (e.g., chunks of digital media and/or related data). For example, content modules may include digital media components (e.g., video and/or audio) of a particular experience as well as metadata, e.g., context encoding and events related to the digital media components. In some embodiments, content servers may deliver digital media components in an augmented media stream that includes metadata provided by one or more application servers.

In some embodiments, content modules may be predefined or generated on the fly in conjunction with one or more application servers based on the interaction between the user and the content. In some embodiments, content modules may include legacy content (e.g., an unmodified, conventional, or non-interactive video) augmented with metadata which encodes content context (e.g., what is happening in the video and/or by whom)), sensing information, actuation information, and/or other information associated with a PAS. In some embodiments, metadata may be delivered out of band (e.g., separate from a digital media stream) or may be delivered in band (e.g., as part of the digital media stream).

In some embodiments, the content system may include one or more application servers and/or application services. An application server may provide a bidirectional or unidirectional metadata stream between the user and the content system or a related content service. Various application servers may provide different functionalities and/or services and may be combined based on a particular content coupled experience or physical activity. For example, for a yoga experience, an application server for detecting physical activity of a user on a PAS may be used in conjunction with an application server for controlling lighting effects in a room where the PAS is located.

In some embodiments, one or more application servers may manage actuation sequences (e.g., haptic feedback related events, such as lighting effects or sound effects, to encourage a user to perform some actions) in various experience related devices (e.g., PASs or programmable lighting elements) and may process user input from the physical devices (e.g., from a sensing layer in a PAS) to provide real-time or near real-time feedback regarding a user's physical activities.

In some embodiments, an application server or a related service may include a user state detection module for detecting, interpreting, and/or analyzing physical activities performed using or on a PAS. For example, a user state detection module may include a pose template generator and/or one or more related algorithms for detecting or recognizing user poses or motions associated with a physical activity and/or a PAS. In some embodiments, an application server or a related service may generate and send metadata synchronously or asynchronously with a content module being delivered to the user.

In some embodiments, the content system may interact with one or more experience related devices, including one or more PASs and/or display screens. Each experience related device may communicate with the content system via wired and/or wireless networking technology. In some embodiments, experience related devices may provide feedback via sensors or other elements to the content system. In some embodiment, the content system may use feedback for providing personalization of an experience, for generating or modifying user profiles and preferences, and/or for configuring various aspects of a PAS.

In some embodiments, the content system may include one or more data storage devices for storing various data. For example, a content system or a server therein may store user profile information and/or user related preferences for personalization and/or configuration purposes related to the content system, a PAS, or other experience related devices.

Figure 6:
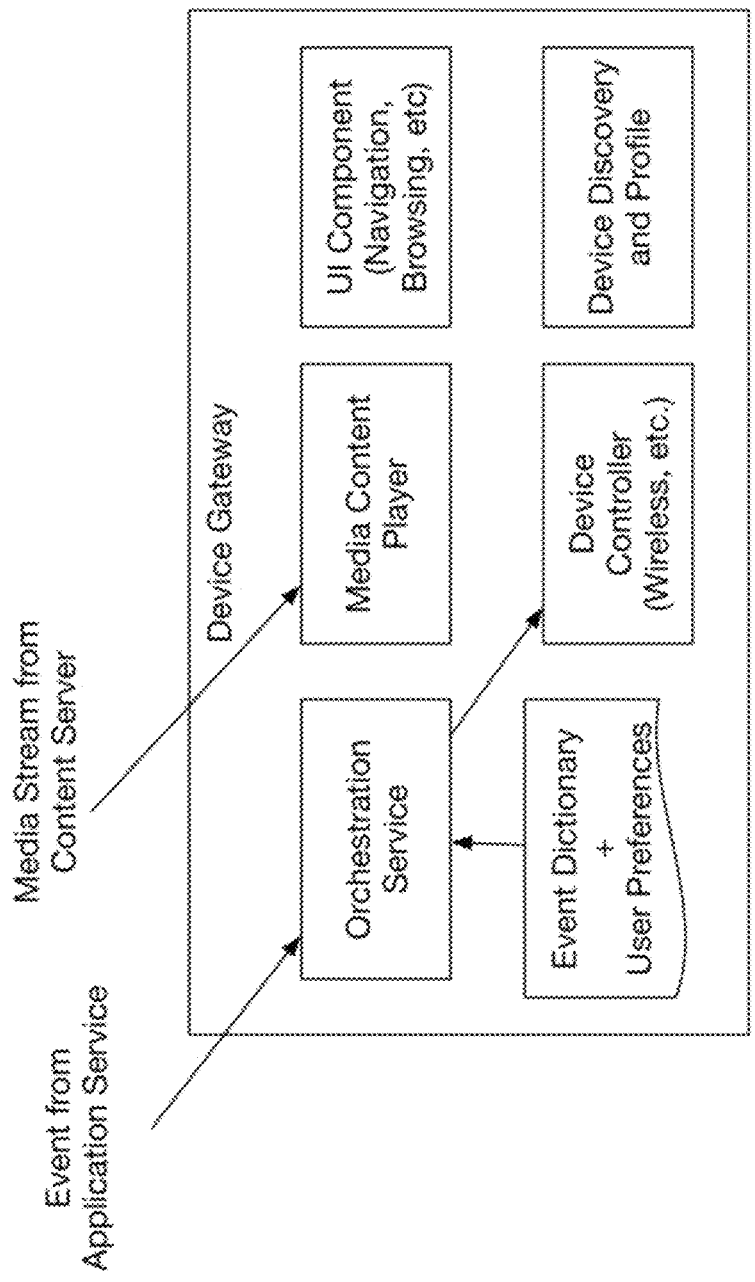
FIG. 6 is a diagram illustrating a device gateway according to an embodiment of the subject matter described herein.

FIG. 6 is a diagram illustrating a device gateway according to an embodiment of the subject matter described herein. The device gateway may represent any suitable entity for facilitating communications between a content system and a PAS or other experience related device. For example, a device gateway may include middleware (e.g., software and/or protocols that connect various applications and/or components) and may act as an intermediary between the content system (e.g., a content service) and the physical devices in the environment.

In some embodiments, the device gateway may include an orchestration service, an event dictionary and/or user preferences information, a media content player, a user interface component module, a device controller, and/or a device discovery and profile module. An orchestration service may include functionality as described above with regard to an orchestration tool. The orchestration service may also receive event information from one or more application services and using an event dictionary and/or user preferences information may determine various actuation commands which can be provided to a device controller for implementing haptic feedback, such as lighting effects and sounds effects, for prompting a user to perform one or more physical activities.

In some embodiments, a user interface component module may include software or code for generating one or more user interfaces associated with navigating, browsing, and selecting or inputting configurations, preferences, and/or other information. In some embodiments, a user interface component module may provide user interface related information to various display devices.

In some embodiments, a media content player may receive content modules from a content server. The media content player may be responsible for playing content via one or more display devices and/or for responding to user input or commands associated with user input, e.g., by pausing, speeding up, or slowing down content. For example, a metadata stream may indicate events dynamically mapped to a physical configuration of a room, where the physical configuration may be detected and configured automatically or manually.

In some embodiments, a device discovery and profile module may include software or code for detecting and/or configuring a PAS and/or other experience related devices, such as a display device. For example, a device discovery and profile module may use one or more device related communications protocols to configure a PAS and a related display device for a particular content coupled experience or activity.

Figure 7:
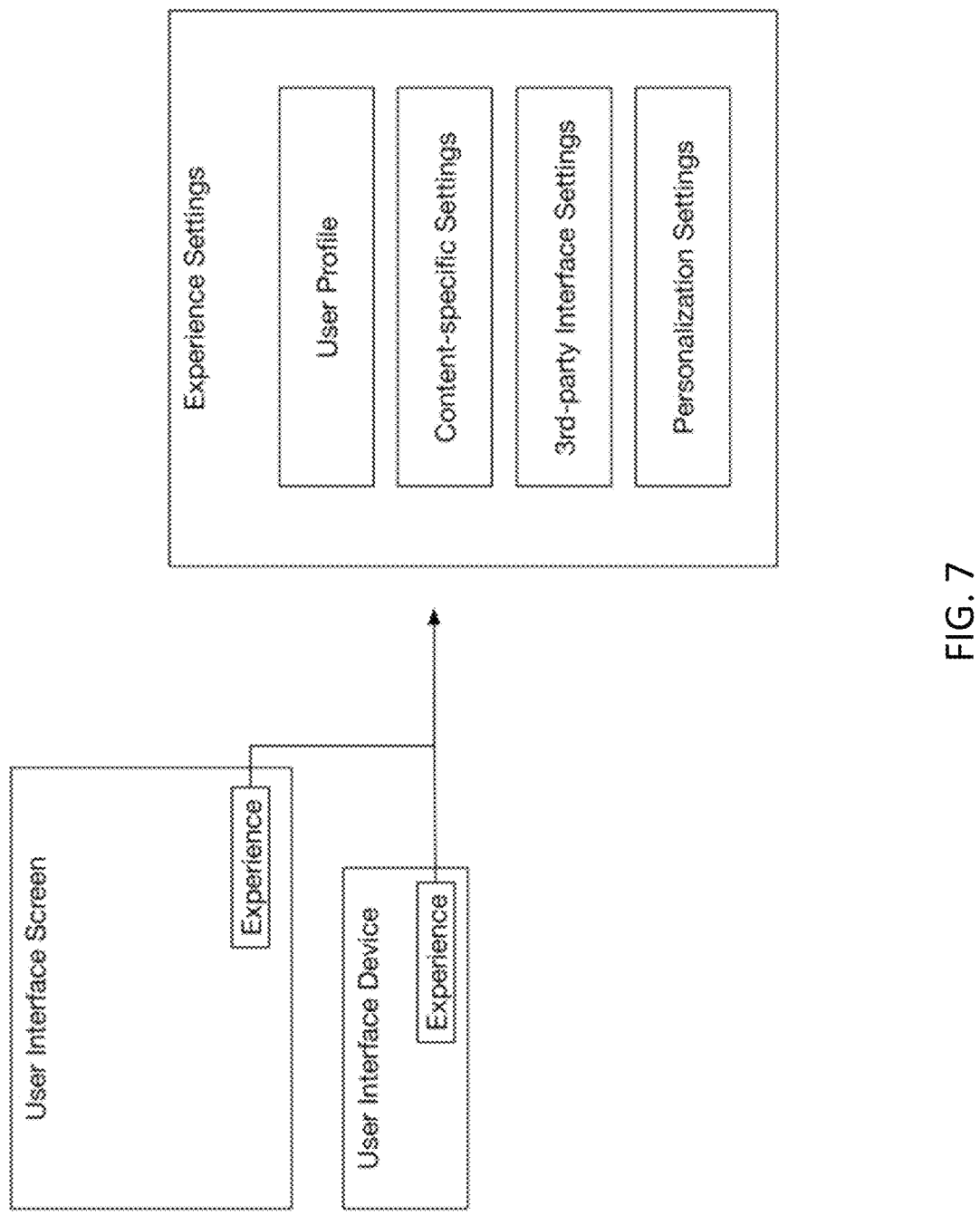
FIG. 7 is a diagram illustrating an experience button according to an embodiment of the subject matter described herein.

FIG. 7 is a diagram illustrating an experience button according to an embodiment of the subject matter described herein. In some embodiments, an experience button may be usable for accessing a user interface for personalizing and configuring content coupled services and/or a PAS. In some embodiments, an experience button may allow a user to view, change, or set various experience related settings. Some example of experience settings may include user profile settings, content-specific settings, third-party interface settings, and/or personalization settings.

In some embodiments, personalization settings may include or involve experience personalization for particular content coupled experiences or physical activities. Examples of experience personalization can include activity based personalization, spatial personalization, temporal personalization, and/or content personalization.

In some embodiments, activity based personalization may involve adjusting a level or a type of sensing, actuation, and/or interaction with a content system or a related content service. For example, a PAS may be configured or adapted to various types of physical activity. For instance, if a current activity is yoga, actuation components (e.g., lighting effects, tactile feedback, and/or sound effects) associated with the PAS may be configured for providing pose related guidance during a yoga routine and a sensing algorithm may be configured for interpreting physical activities performed by the user and evaluating whether or not the user has fulfilled or performed the poses. If the activity changes to playing a game, such as "whack a mole", actuation components (e.g., lighting effects, tactile feedback, and/or sound effects) on the PAS may be configured for depicting randomly placed spots which represent the "moles" and a sensing algorithm may be configured for interpreting physical activities performed by the user and determining whether a spot has been touched by a user, which, if so, may affect scoring in the game.

In some embodiments, spatial personalization may involve adjusting spatial related settings associated with action events and/or sensing events. For example, spatial personalization for an experience or a related physical activity, such as a yoga routine, may involve adjusting actuation prompts, such as lights that indicate preferred hand and feet positions during a yoga pose, based on known, estimated, or detected physical dimensions of a user. In this example, the PAS may be able to provide appropriate actuation and sensing configurations according to the physical dimensions of the user.

In some embodiments, temporal personalization may involve adjusting the pacing and/or speed of a content coupled experience or related activity. For example, temporal personalization for a content coupled experience or a related physical activity, such as a yoga routine, may involve adjusting the pace of the yoga routine to a preferred, detected, or estimated pace of user. In some embodiments, the pace of a user may be determined using feedback provided by a user and/or by a PAS. For example, if a user is unable to match the speed of position changes in a normal playback of a yoga routine video, the pacing or playback of the video may be slowed or adjusted accordingly. In another example, for an exercise routine consisting of various floor exercises, a PAS may be configured to wait and progress in the exercise routine only after a user has completed a required number of repetitions for each exercise, e.g., as detected by a sensor array associated with PAS.

In some embodiments, content personalization may involve adjusting content based on user preferences and/or user evaluations. For example, content personalization for a content coupled experience or a related physical activity, such as a yoga routine, may involve evaluating performance of a user. In this example, as a user develops from a novice user to a more advanced user, a content system or a related service may determine a skill level based on the user's detected performance and may use the skill level when determining whether to adjust the difficulty of the experience or portions thereof. Continuing with the example, the adjustment of content may help further develop the user's skill as well as to garner continued interest in the physical activity.

In some embodiments, personalization settings may be adjusted for one user and/or for a group of users. For example, for one or more content coupled experiences, unique settings may be stored for a particular group of people interacting with a content system. In another example, settings may be maintained for multiple modes of interaction including individual users, pair wise interactions, group based interactions, and/or competitive interactions.

In some embodiments, multiple users may interact synchronously and asynchronously with a content system or a content service via different PASs. Experience personalization settings may be tailored to individual users or groups of users. User interaction may involve various modes of interactions, such as leader follower, peer to peer, and collective activity. The content system or the content service may also support group based competitive activities and/or challenge driven activities.

Figure 8:
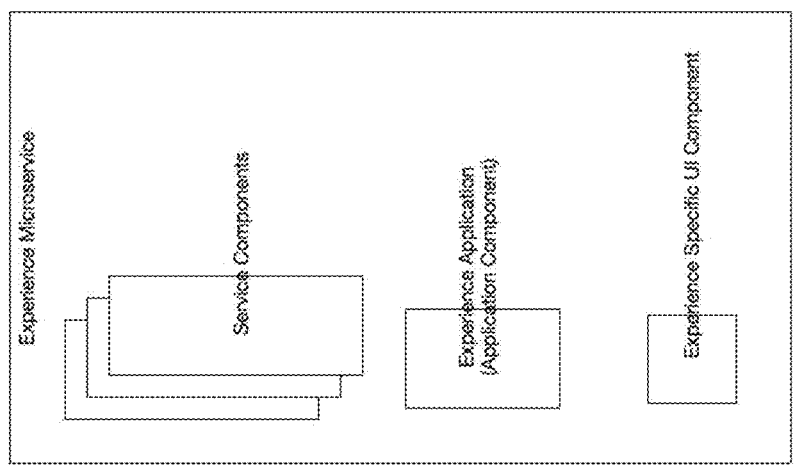
FIG. 8 is a diagram illustrating an experience microservice according to an embodiment of the subject matter described herein.

FIG. 8 is a diagram illustrating an experience microservice according to an embodiment of the subject matter described herein. In some embodiments, one or more application servers may form or generate service components (e.g., software or code for particular services or purposes). In such embodiments, these service components may be combined with experience applications (e.g., software or code for providing a particular content coupled experience), and an experience specific user interface component (e.g., software or code for displaying screen graphics and/or generating haptic feedback at experience related device) to form experience microservices.

In some embodiments, the content system can provide, utilize, or allow microservices for greater modularity and scalability and/or for allowing integration into third party services and/or parallel development of individual components. For example, a third party developer may author microservices to augment new content formats and to augment legacy content with encoded metadata for action primitives and/or to allow personalization. In this example, legacy content delivered by Netflix or YouTube services may be augmented with metadata for a specific physical activity, via an API for the content system. Continuing with this example, metadata may be delivered in real-time, synchronously, offline, or asynchronously with the associated media content. In another example, a third party developer may author microservices or functions therein for developing community-based physical activities.

In some embodiments, an experience application may include a module for generating new types of physical activity experiences via various pose recognition and pose template generation methods and/or techniques. For example, an experience application may be configured to detect various new poses or movements and may provide software or code to one or more components in a PAS for detecting such poses or movements.

In some embodiments, an experience application and/or an experience specific user interface component may be configured to affect action events and/or feedback mechanisms associated with a PAS or content coupled experience. For example, an experience application may allow configuring and management of experience related devices, including a PAS, room lighting, vibrators in furniture for tactile feedback, devices connected via home automation systems, etc. In this example, each experience related device may be configured to operate in association with content playback via an orchestration service or a related tool.

Figure 9:
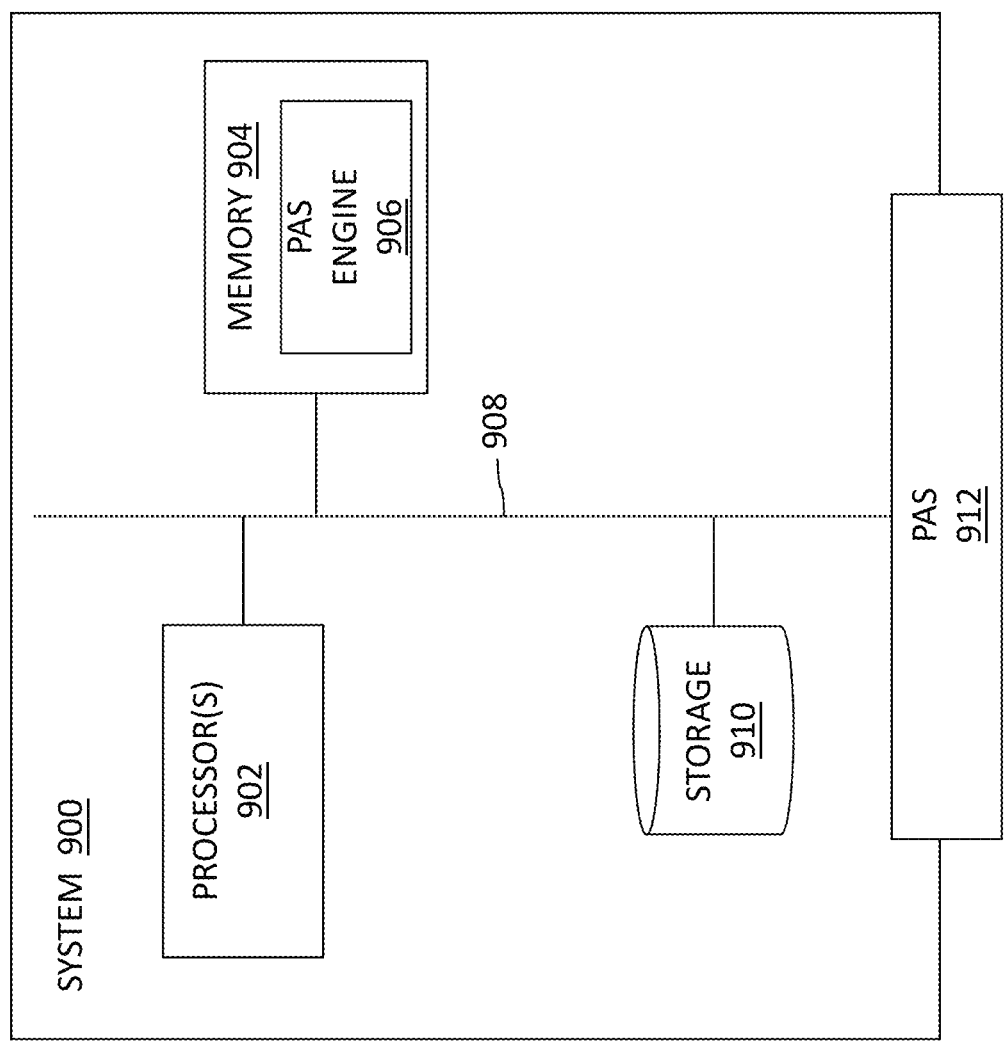
FIG. 9 depicts a high level block diagram of a computer system for performing various functions described herein.

FIG. 9 depicts a high level block diagram of a computer system 900 suitable for use in performing various functions described herein. For example, computer system 900 may be a content system or a related system for performing various aspects and/or functions described herein. In some embodiments, computer system 900 may be a single device or node or may be distributed across multiple devices or nodes.

As depicted in FIG. 9, computer system 900 includes one or more processor(s) 902, a memory 904, and storage 910 communicatively connected via a system bus 908. Computer system 900 may include or communicate with PAS 912. In some embodiments, processor(s) 902 can include a microprocessor, a central processing unit (CPU), a graphics processing unit (GPU), and/or any other like hardware based processing unit. In some embodiments, a PAS engine 906 can be stored in memory 904, which can include random access memory (RAM), read only memory (ROM), optical read/write memory, cache memory, magnetic read/write memory, flash memory, or any other non-transitory computer readable medium.

PAS engine 906 may include logic and/or software for performing various functions described herein. In some embodiments, PAS engine 906 may include or utilize processor(s) 902 or other hardware to execute software and/or logic. For example, PAS engine 906 may perform various functions associated with providing a content coupled experience via seamless delivery of content (e.g., a video) and instructions for haptic feedback (e.g., light effects, vibrations, sound effects, etc.) via PAS 912 and/or other experience related devices.

PAS 912 may represent any device (e.g., a smart surface) for detecting physical activity and/or for providing physical effects and/or haptic feedback to the user. In some embodiments, PAS 912 may include sensors for detecting physical user state and/or feedback. For example, PAS 912 may include a sensor array for detecting pressure, contact, and/or heat associated with a user's body or body parts. In some embodiments, PAS 912 may include one or more components or actuators for performing a physical effect and/or prompting a user to perform a physical activity. For example, a PAS may include actuators for generating vibrations, speakers for outputting sounds, and/or thermochromic ink for displaying visual effects.

In some embodiments, PAS 912 may be connectable to a computer network. PAS 912 may include an actuation layer comprising at least one actuator for prompting a user to perform a physical action, wherein the at least one actuator includes a programmable lighting element and a sensing layer comprising at least one sensor for detecting feedback from the user. In some embodiments, a programmable lighting element may include a light emitting diode, electrochromic ink, thermochromic ink, or magnetic particles. In some embodiments, a sensor may include a resistor or a conductive trace.

In some embodiments, an actuation layer may include a printed speaker. In some embodiments, an actuation layer and a sensing layer may be integrated into a single layer using at least one printed electronics technique.

In some embodiments, PAS 912 may be configured to receive, from a computing system in the network, information about a physical action to perform, to perform the action using the at least one actuator, to detect the feedback from the user using the at least one sensor, and to provide the feedback from the user to the computing system in the network, wherein the feedback from the user is usable in determining a subsequent physical action to perform using the at least one actuator.

In some embodiments, computer system 900 may include one or more communications interfaces to communicate with PAS 912 and/or other entities. Example communications interfaces may use various protocols and may allow PAS 912 or components therein to communicate with computer system 900 or entities therein (e.g., PAS engine 906). For example, one or more communications interfaces may be used for communications between PAS 912 and PAS engine 106, such as a communications interface for receiving feedback from PAS 912 to PAS engine 106 and a same or different communications interface for providing content and/or instructions to PAS 912 from PAS engine 106.

In some embodiments, processor(s) 902 and memory 904 can be used to execute and manage the operation of PAS engine 906. In some embodiments, storage 910 can include any storage medium, storage device, or storage unit that is configured to store data accessible by processor(s) 902 via system bus 908. In some embodiments, storage 910 can include one or more local databases hosted by computer system 900.

Figure 10:
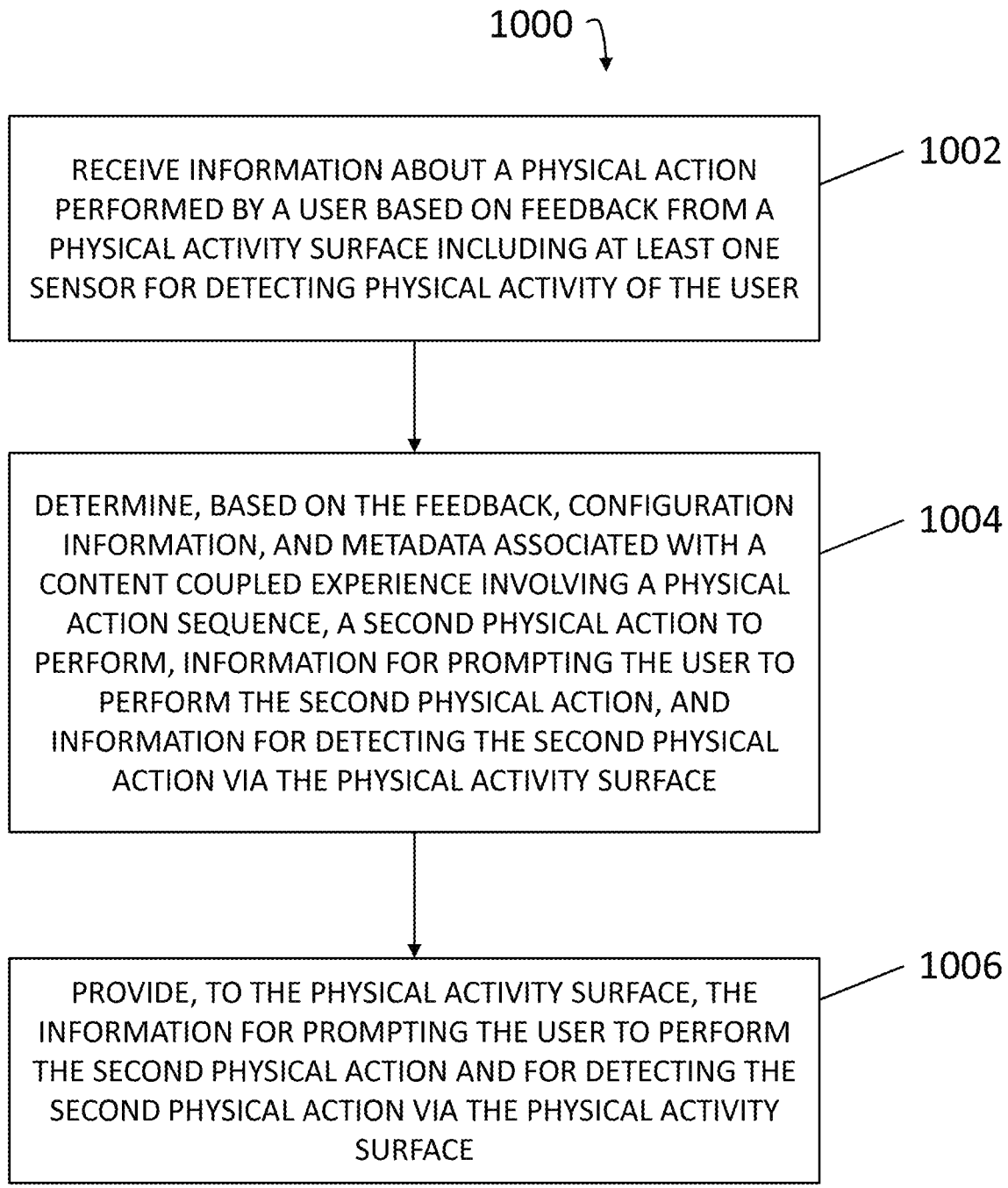
FIG. 10 is a flow chart illustrating a process involving a content coupled physical activity surface according to an embodiment of the subject matter described herein.

FIG. 10 is a flow chart illustrating a process 1000 involving a content coupled physical activity surface according to an embodiment of the subject matter described herein. In some embodiments, process 1000, or portions thereof (e.g., steps 1002, 1004, and/or 1006), may be performed by or at a PAS (e.g., PAS 912), PAS engine 906, a content system (e.g., computer system 900), and/or another system, node, or module.

Referring to FIG. 10, at step 1002, information about a physical action (e.g., a physical activity) performed by a user based on feedback from a PAS may be received. The PAS may include at least one sensor for detecting physical activity of the user.

At step 1004, it may be determined, based on the feedback, configuration information, and metadata associated with a content coupled experience involving a physical action sequence, a second physical action to perform and information for prompting the user to perform the second physical action and information for detecting the second physical action via the physical activity surface.

At step 1006, the information for prompting the user to perform the second physical action and for detecting the second physical action via the physical activity surface may be provided to the PAS.

In some embodiments, a PAS may include an actuation layer comprising at least one actuator for prompting a user to perform a physical action, wherein the at least one actuator includes a programmable lighting element, and wherein the physical activity surface includes a sensing layer comprising the at least one sensor for detecting feedback.

In some embodiments, metadata may include an action event for prompting a user to perform an action and a sensing event for detecting when or whether the user performs the action.

In some embodiments, content coupled experience may include media content, a video, an audio recording, a legacy or non-interactive video, an interactive video, a virtual world, or a game.

In some embodiments, configuration information may include user preferences, settings for a PAS, or settings for a content coupled experience.

In some embodiments, information for prompting a user to perform a second physical action may include information for instructing a programmable lighting element or a haptic feedback element.

In some embodiments, information for detecting a second physical action via a PAS may include information for instructing at least one sensor associated with the PAS.

In some embodiments, determining a second physical action to perform may include determining a skill level associated with a user using feedback.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system comprising:
a physical activity surface connectable to a computer network, the physical activity surface comprising:
an actuation layer comprising at least one actuator for prompting a user to perform a physical action, wherein the at least one actuator includes a programmable lighting element; and
a sensing layer comprising at least one sensor for detecting feedback from the user, wherein a computer communicatively coupled to the physical activity surface is configured to receive metadata regarding attributes of a terrain in a virtual world, wherein at least some of the metadata is from a remote user in a group that includes the user, wherein the remote user is a leader of the group, and to provide, via the at least one actuator and using the metadata and the feedback from the at least one sensor and haptic feedback corresponding to the terrain in the virtual world as the user moves on the physical activity surface, wherein the terrain in the virtual world is based on a current location of an avatar and a direction that the user is moving on the physical activity surface and wherein the physical activity surface enables the user to interact with a content system that provides for leader-follower interaction with the leader of the group.

2. The system of claim 1 wherein the physical activity surface is configured to receive, from a computing system in the computer network, information about the physical action to perform, to perform the physical action using the at least one actuator, to detect the feedback from the user using the at least one sensor, and to provide the feedback from the user to the computing system in the network, wherein the feedback from the user is usable in determining a subsequent physical action to perform using the at least one actuator.

3. The system of claim 1 wherein the sensor includes a resistor or a conductive trace.

4. The system of claim 1 wherein the programmable lighting element includes a light emitting diode, electrochromic ink, thermochromic ink, or magnetic particles.

5. The system of claim 1 wherein the actuation layer includes a printed speaker.

6. The system of claim 1 wherein the actuation layer and the sensing layer are integrated into a single layer using at least one printed electronics technique.

7. A method involving a content coupled physical activity surface, the method comprising:
receiving information about a physical action performed by a user based on feedback from a physical activity surface including at least one sensor for detecting physical activity of the user;
determining, based on the feedback, configuration information, and metadata associated with a content coupled experience involving a physical action sequence, a second physical action to perform, information for prompting the user to perform the second physical action, and information for detecting the second physical action via the physical activity surface, wherein at least some of the metadata is from a remote user in a group that includes the user, wherein the remote user is a leader of the group; and
providing, to the physical activity surface, the information for prompting the user to perform the second physical action and for detecting the second physical action via the physical activity surface, wherein a computer communicatively coupled to the physical activity surface is configured to receive metadata regarding attributes of a terrain in a virtual world and to provide, via at least one actuator and using the metadata and the feedback from the at least one sensor, haptic feedback corresponding to the terrain in the virtual world as the user moves on the physical activity surface, wherein the terrain in the virtual world is based on a current location of an avatar and a direction that the user is moving on the physical activity surface, wherein the physical activity surface enables the user to interact with a content system that provides for leader-follower interaction with the leader of the group.

8. The method of claim 7 wherein the physical activity surface includes an actuation layer comprising the at least one actuator for prompting a user to perform a physical action, wherein the at least one actuator includes a programmable lighting element, and wherein the physical activity surface includes a sensing layer comprising the at least one sensor for detecting the feedback.

9. The method of claim 7 wherein the metadata includes an action event for prompting the user to perform an action and a sensing event for detecting when or whether the user performs the action.

10. The method of claim 7 wherein the content coupled experience includes media content, a video, an audio recording, a legacy or non-interactive video, an interactive video, a virtual world, or a game.

11. The method of claim 7 wherein the configuration information includes user preferences, settings for the physical activity surface, or settings for the content coupled experience.

12. The method of claim 7 wherein the information for prompting the user to perform the second physical action includes information for instructing a programmable lighting element or a haptic feedback element.

13. The method of claim 7 wherein the information for detecting the second physical action via the physical activity surface includes information for instructing the at least one sensor associated with the physical activity surface.

14. The method of claim 7 wherein determining the second physical action to perform includes determining a skill level associated with the user using the feedback.

15. A system involving a content coupled physical activity surface comprising:
at least one processor; and
a memory;
wherein the system is configured to receive information about a physical action performed by a user based on feedback from a physical activity surface including at least one sensor for detecting physical activity of the user, to determine, based on the feedback, configuration information, and metadata associated with a content coupled experience involving a physical action sequence, a second physical action to perform, information for prompting the user to perform the second physical action, and information for detecting the second physical action via the physical activity surface, wherein at least some of the metadata is from a remote user in a group that includes the user, wherein the remote user is a leader of the group, and to provide, to the physical activity surface, the information for prompting the user to perform the second physical action and for detecting the second physical action via the physical activity surface, wherein a computer communicatively coupled to the physical activity surface is configured to receive metadata regarding attributes of a terrain in a virtual world and to provide, via at least one actuator and using the metadata and the feedback from the at least one sensor, haptic feedback corresponding to the terrain in the virtual world as the user moves on the physical activity surface, wherein the terrain in the virtual world is based on a current location of an avatar and a direction that the user is moving on the physical activity surface, wherein the physical activity surface enables the user to interact with a content system that provides for leader-follower interaction with the leader of the group.

16. The system of claim 15 wherein the physical activity surface includes an actuation layer comprising the at least one actuator for prompting a user to perform a physical action, wherein the at least one actuator includes a programmable lighting element, and wherein the physical activity surface includes a sensing layer comprising the at least one sensor for detecting the feedback.

17. The system of claim 15 wherein the metadata includes an action event for prompting the user to perform an action and a sensing event for detecting when or whether the user performs the action.

18. The system of claim 15 wherein the content coupled experience includes media content, a video, an audio recording, a legacy or non-interactive video, an interactive video, a virtual world, or a game.

19. The system of claim 15 wherein the configuration information includes user preferences, settings for the physical activity surface, or settings for the content coupled experience.

20. The system of claim 15 wherein the information for prompting the user to perform the second physical action includes information for instructing a programmable lighting element or a haptic feedback element.

21. The system of claim 15 wherein the information for detecting the second physical action via the physical activity surface includes information for instructing the at least one sensor associated with the physical activity surface.

22. The system of claim 15 wherein the system is configured to determine a skill level associated with the user using the feedback.

23. A non-transitory computer readable medium having stored thereon executable instructions that when executed by a processor of a computer causes a computer to perform steps comprising:
receiving information about a physical action performed by a user based on feedback from a physical activity surface including at least one sensor for detecting physical activity of the user;
determining, based on the feedback, configuration information, and metadata associated with a content coupled experience involving a physical action sequence, a second physical action to perform, information for prompting the user to perform the second physical action, and information for detecting the second physical action via the physical activity surface, wherein at least some of the metadata is from a remote user in a group that includes the user, wherein the remote user is a leader of the group; and
providing, to the physical activity surface, the information for prompting the user to perform the second physical action and for detecting the second physical action via the physical activity surface, wherein a computer communicatively coupled to the physical activity surface is configured to receive metadata regarding attributes of a terrain in a virtual world and to provide, via at least one actuator and using the metadata and the feedback from the at least one sensor, haptic feedback corresponding to the terrain in the virtual world as the user moves on the physical activity surface, wherein the terrain in the virtual world is based on a current location of an avatar and a direction that the user is moving on the physical activity surface, wherein the physical activity surface enables the user to interact with a content system that provides for leader-follower interaction with the leader of the group.

* * * * *